May 15, 1951 A. BASHOVER 2,553,230
FULLY SEPARABLE SLIDE FASTENER
Filed Nov. 10, 1948 2 Sheets-Sheet 1

*INVENTOR.*
ALBERT BASHOVER
BY James and Franklin
Attorneys

May 15, 1951        A. BASHOVER        2,553,230

FULLY SEPARABLE SLIDE FASTENER

Filed Nov. 10, 1948        2 Sheets-Sheet 2

INVENTOR.
ALBERT BASHOVER
BY James and Franklin
Attorneys

Patented May 15, 1951

2,553,230

UNITED STATES PATENT OFFICE 2,553,230

FULLY SEPARABLE SLIDE FASTENER

Albert Bashover, Newark, N. J., assignor to Conmar Products Corporation, Newark, N. J., a corporation of New Jersey Application November 10, 1948, Serial No. 59,330

11 Claims. (Cl. 24—205.11)

1

The invention relates to fully separable slide fasteners.

The prior art has recognized the need for a separable fastener which permits opening or disengagement of the fastener elements from the bottom, a so-called "bottom opening separable." For example, Austin patents numbered 2,146,714, issued February 14, 1939, and 2,263,481, issued November 18, 1941, and Marinsky Patents 2,358,178 and 2,358,179, disclose separable slide fasteners provided with means to permit the stringers to be separated behind the engaging end of the slider or after the slider has been moved upwardly some distance along the fastener. The means provided by Austin and Marinsky for accomplishing this purpose include comparatively complicated hardware and intricate latch devices, but what is more important, these prior art constructions open the entire fastener on both sides of the slider, and do not allow the fastener to be closed for a segment when the fastener is open below the slider.

One common use for a fully separable slide fastener is on a coat or windbreaker. This tends to bunch up or fold uncomfortably at the bottom when the wearer is seated, unless the garment is fully opened which is not satisfactory in cold weather. On the other hand, it is not good to simply invert the slide fastener, for a person standing or walking in moderate weather may prefer to open the coat for a short distance at the neck. If one visualizes a coat having a long series of closely spaced buttons instead of a slide fastener, it will be appreciated that the wearer would have complete freedom in opening the garment partially at the neck, or at the bottom, or both, as conditions and weather might suggest. Considered in this aspect, an object of my invention is to provide a fully separable slide fastener which will afford the user that freedom and flexibility of adjustment.

Another object of the invention is to eliminate the usual clip or socket-forming member while at the same time providing means for retaining the stringers in proper juxtaposition when it is desired to disengage or initiate engagement of the stringers.

A further object of the invention is to provide an improved fully separable slide fastener of simple construction which permits manipulative operation similar to the present commercial type of separable fastener, thereby requiring little or no education of the ultimate user of an article or garment having incorporated therein my novel slide fastener.

2

To the accomplishment of the foregoing general objects and other more detailed objects which hereinafter appear, my invention consists in the completely separable slide fastener elements and their relation one to another as are hereinafter more particularly described in the following specification and sought to be defined in the claims. The specification is accompanied by the drawings in which:

Figure 1:
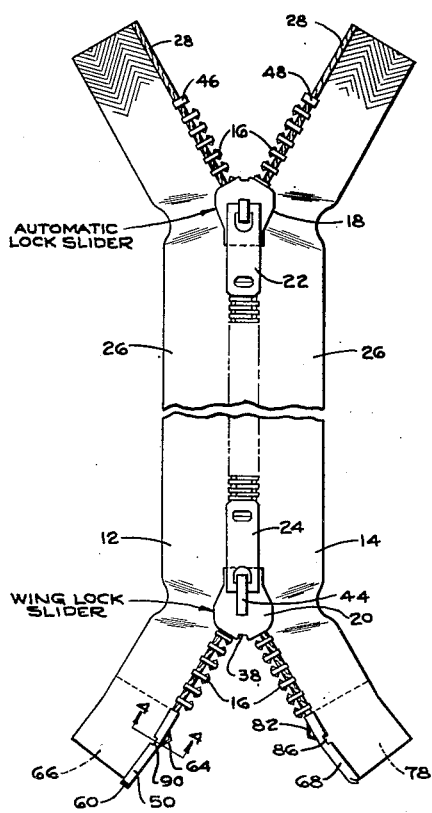
Fig. 1 is a front elevation of my novel slide fastener.

Referring to the drawings, particularly to Figs. 1 through 7, the slide fastener of the present invention comprises stringers 12 and 14, each provided with spaced interlockable fastener elements 16 and a pair of sliders 18 and 20 movable therealong by means of suitable "pulls" 22 and 24, respectively.

Figure 2:
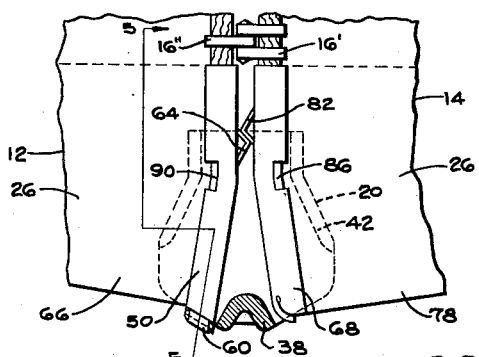
Fig. 2 is a fragmentary view, on an enlarged scale, of one end of the fastener, with the top half of the slider removed for the purpose of clarity in illustration.
Figure 3:
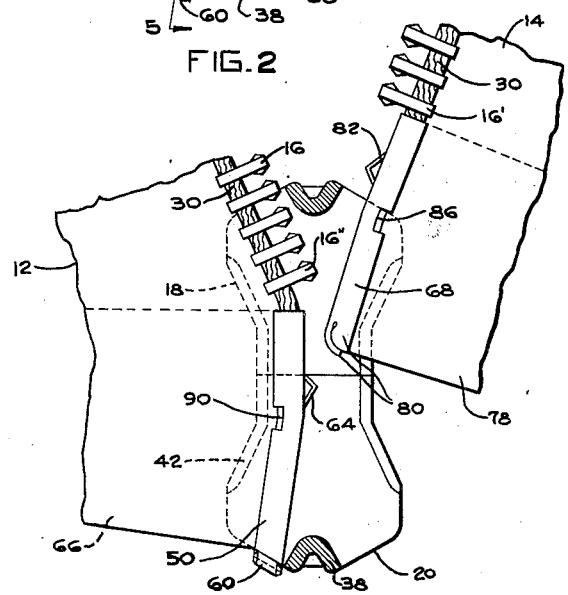
Fig. 3 is a view similar to Fig. 2 illustrating the manner in which the slide fastener stringers are either initially engaged or completely disengaged.

The fastener is fully separable, and includes a fully separable bottom stop which is best shown in Figs. 2 and 3 of the drawing, the female or socket portion of said bottom stop consisting of the slider 20. The invention as viewed in Fig. 1 may be described as comprising a pair of stringers having top stops 46 and 48 at one end and elongated pins 50 and 68 at the other end, with two conventional sliders 18 and 20 slidably disposed below the top stops and above the pins. The slider 20 is dimensioned to either receive both of the pins 50 and 68, as shown in Fig. 2, or to slide on both of the stringers, as shown in Fig. 1, and in practice the slider 20, like the slider 18, is preferably a conventional or standard slider.

The sliders 18 and 20 are preferably disposed with their narrow or stem ends toward one another and their wide or neck ends remote from one another, so that the slider 18 may be used to open the stringers from the top toward the bottom as far as desired, while the slider 20 may be used to open the stringers from the bottom to the top as far as desired. The interlockable elements or so-called "scoops" 16 of the stringers are preferably double-acting elements, that is, elements susceptible of being meshed or unmeshed in either direction. It is not essential to employ symmetrical scoops for this purpose, and there are some known double-acting scoops which, if superficially examined, look the same as single-acting scoops, but symmetrical scoops are most smooth in action, and therefore are somewhat preferred, and have been shown in the drawing.

In addition to the elements already mentioned, one of the stringers, in this case stringer 12, is preferably provided with stop means indicated at 60, 62 to prevent the slider 20 from sliding off the pin 50 when the bottom stop is opened as shown in Fig. 3, and it will be understood that the other pin 68 on stringer 14 is devoid of such stop means and is therefore readily removable from the slider. From this viewpoint the fastener as viewed in Fig. 1 comprises a pair of stringers 12 and 14 and a pair of conventional sliders 18 and 20, the stringers 12 and 14 having elongated pins 50 and 68 at one end, and the stringer 12 having stop means (46 and 60) at both ends.

By reference to Figs. 2 and 3 it will be seen that the pins are substantially greater in length than the slider 20. The pin 50 is long enough to hold the sliders 18 and 20 in superposed registration, as shown in Fig. 3, while the pin 68 facilitates threading the end of stringer 14 through the superposed sliders when re-assembling the stringers after full separation. For this threading purpose alone the pin 68 might be shorter, but it is preferably of substantially the same length as the pin 50 in order to prevent escape of the pin 68 from the slider 20 when the stringers are meshed as shown in Fig. 2. On the other hand, to prevent excessive downward movement of the pin 68, the pin 50 is preferably provided with additional stop means shown at 64 for engaging a cooperating stop 62 on pin 68, thereby limiting the insertion of the latter in the slider or socket portion 20 of the bottom stop, or, in other words, thereby assuring side-by-side registration of the pins and consequently proper mesh of the stringers.

The stringers 12 and 14 comprise tapes 26 provided with beaded edges 28 about which the fastener elements 16 are secured, as by clamping. The beaded edges 28 may be formed in the conventional manner as by sewing cords 30 and 32, shown in deformed condition in Fig. 4, on opposite sides of the tape 26 along an edge thereof. The beaded edge may also be formed by weaving a cord into the edge of the tape or by folding the edge of the tape itself in any desired manner.

The fastener elements 16, although of the double acting type, require no detailed description, because many forms are well known in the art. Such fastener elements are readily engaged or disengaged by easy movement of the slider in either direction.

Figure 5:
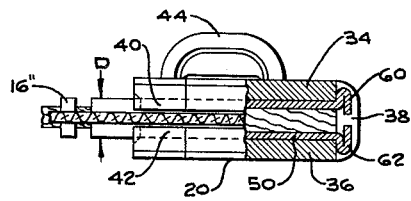
Fig. 5 is a view, partly in section, taken approximately in the plane of line 5—5 of Fig. 2, both halves of the slider being shown.

The sliders 18 and 20 may be of conventional type, which is one advantage of the invention. Slider 20, for example, as shown in Fig. 5, comprises the usual spaced top and bottom walls or so-called "wings" 34 and 36, respectively, joined at one end by a neck or post 38. The top wing is provided with inturned rails or flanges 40 and the bottom wing with inturned rails or flanges 42, which together with the neck or post 38 form the usual Y-shaped channel. The finger piece or so-called "pull" 24 is secured to a lug 44 formed on the top wing 34. A similar description would apply to slider 18.

It is within the scope of the invention to use sliders 18 and 20 of either the non-locking or locking type. The locking type slider may be any of the known kinds, such as an automatic lock, pin lock, cam lock or wing lock.

An automatic lock is one which locks automatically when not being moved by means of the pull, examples being the locks shown in U. S. patents to Berg 2,289,955 and Mikulus et al. 2,360,437. A pin lock is a lock in which the pull carries a pin adapted to engage between elements when the pull is turned down to flat position, such locks being shown in U. S. patents to Whitney 1,589,- 498, Phillips 1,650,649, and Ulrich 2,293,448. A cam lock is a lock in which the pull, when turned down to flat position, wedges or cams the slider and elements into locked condition, such sliders being shown in U. S. patents to Whitney 1,598,183 and Ulrich 2,293,448. A wing lock slider is a slider so shaped at its wide end as to become locked against movement when the stringers are separated or subjected to cross pull, such locks being shown in U. S. patents to Ulrich 1,723,496 and 2,279,767.

The two sliders may be used in any desired combination; that is to say, slider 18 may be a non-locking type whereas slider 20 may be a locking type and vice versa, or they may be alike, that is, both locking or both non-locking. The preferred construction, however, is to use lock sliders so that they will stay where adjusted, and one preferred combination of sliders 18 and 20, is an automatic lock and wing lock, respectively, as indicated on Fig. 1, but this latter preference is not critical, and is not intended to be in limitation of the invention.

To limit the movement of the sliders at the top end of the fastener, a pair of conventional top stops 46 and 48 are secured to the stringers 12 and 14, respectively. It is to be understood that the terms "top" and "bottom" or "upper" and "lower" are here used as is customary in the art, but the fastener may, of course, be used in any position.

Figures 6, 7:
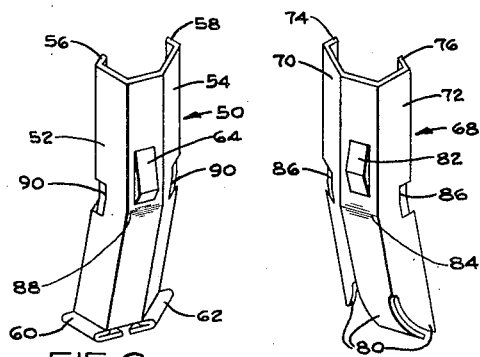
Fig. 6 is a perspective view, on an enlarged scale, of a stud-like member which is attached to the end of one stringer.
Fig. 7 is a perspective view, on an enlarged scale, of a pin-like member which is secured to the end of the other stringer.
Figure 4:
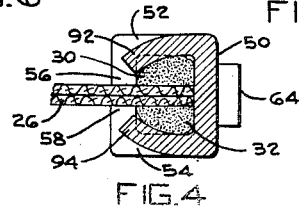
Fig. 4 is a cross-section taken along the line 4—4 of Fig. 1.

The pin or stud 50, prior to clamping the same about the beaded edge of the tape, is shown in detail in Fig. 6, and comprises a pair of sides 52 and 54 having inturned edges or flanges 56 and 58, respectively. As shown in Fig. 4, when the stud is clamped onto the beaded edge of the tape, the flanges 56 and 58 are disposed behind the cords 30 and 32 to securely maintain the stud in position upon the stringer. After the stud is secured to the stringer it possesses a substantially square cross-section, with its dimension, "D," substantially equal to the corresponding dimension of the fastener elements 16 in a direction perpendicular to the plane of the fastener. This dimensioning and configuration of the stud serves to maintain the sliders in proper position upon the stud and facilitates proper relative movement of the stud through the slider channels.

The slider stops 60 and 62 are formed integrally at the extreme lower end the pin. As is best shown in Fig. 5, the stops 60 and 62 extend perpendicularly to the plane of the fastener when the pin or stud is secured to the stringer 12. The stops may be formed by suitably bending the strip of metal of which the stud 50 is formed. The pin stop 64 is preferably located intermediate the ends of the stud 50 and in the plane of interengagement of the fastener elements 16, and is preferably struck up integrally from the body of the stud 50.

In order to strengthen and stiffen the fabric material at the lower end of the stringer 12 and to prevent unravelling of the threads at the extreme lower edge of the tape, it is preferred to fold the tape as indicated at 66 (Fig. 1) before clamping the stud 50 thereon. To avoid undue bulk within the stud 50, the cords 30 and 32 preferably are removed from the upwardly folded portion 66, so that the material clamped within the stud includes two tape edges and only two cords. It shall be understood, however, that the folding of the tape end and the cord cutting are not essential for the operation of the invention. The tape end may be left unfolded and may be impregnated with a suitable plastic compound to impart stiffness thereto and prevent unravelling.

Figs. 2, 3 and 5 show the slider 20 in lowermost position. At this time portions of the top and bottom slider wings 34 and 36, adjacent the neck 38, bear against the stops 60 and 62. It is understood, of course, that while two stops are provided, this constitutes a preferred form of the invention, and one stop only need be formed on the stud to achieve satisfactory results.

The stringer 14 is provided at its lower or bottom end with a sleeve-like pin 68 having a substantially U-shaped contour similar to that of the stud 50. The pin 68 comprises sides 70 and 72 and inturned edges 74 and 76, respectively, for the purpose of securely maintaining the pin on the tape when it is clamped around the beaded edge 28 of the stringer 14. Preferably, the lower end of the tape 26 about which the pin 68 is secured is folded at 78 for the same purpose as the fold 66 on the stringer 12. The pin 68, which preferably is formed from a strip of metal, is provided with short tongues 80 in order to form a substantially closed end for the extreme lower end of the pin. The pin 68 is formed with a projection 82 intermediate its ends and in the plane of engagement of the fastener elements 16. The projection 82 cooperates with the stop 64 previously referred to.

As is evident from the illustration of the slide fastener in Figs. 1 and 2, it may be closed throughout its length when the slider 18 is in its uppermost position against the top stops 46 and 48, and the slider 20 is in its lowermost position bearing against the stops 60 and 62 and with the pin 68 disposed within the stem and one branch of the Y-shaped channel of slider 20. The fastener may be opened from either end by moving the slider 18 downwardly or by moving the slider 20 upwardly. In this manner, the fastener may be opened or closed any desired amount from either end of the fastener independently of the amount the fastener is opened or closed at the other end. The fastener elements 16 intermediate the sliders 18 and 20 are in interlocking engagement and maintain the stringers in engagement along any desired portion of the fastener. The fastener may be maintained closed at the top and open at the bottom, and conversely the fastener may be maintained closed at the bottom and open at the top, or may be open at both ends.

In order to completely separate the stringers 12 and 14, the slider 20 is moved to its lowermost position against the stops 60 and 62, thereby completing the separable bottom stop assembly, as shown in Fig. 2. The slider 18 is moved downwardly to the assembly, that is, until it contacts the slider 20 so that the stems of the Y-shaped channels are adjacent each other, as shown in Fig. 3. When the sliders are in this position the fastener elements of the stringers 12 and 14 are unmeshed, the lowermost fastener element on at least one of the stringers being located above the stem portion of the upper slider 18, as shown. The stringer 14 is merely lifted upwardly, whereupon the pin 68 moves out from the channels of both sliders. The stringer 12 retains the sliders 18 and 20 thereon, whereas the stringer 14 may be termed the slider releasing stringer. In order to initiate engagement of the fastener elements 16 on the stringers 12 and 14, the converse operation is followed. With the sliders 18 and 20 in the positions shown in Fig. 3, the pin 68 is threaded through both sliders, or more specifically, through one branch and the stem of slider 18, and then the stem and one branch of slider 20. The limit of downward movement of the pin 68 and its stringer 14 occurs when the pin projection 82 engages the stud projection or stop 64. The slider 18 may then be moved upward to any desired position along the stringers, with the slider 20 left in its downmost position if it be desired that the fastener remain closed at the bottom. If it be desired to open the fastener from the bottom, the slider 20 simply is moved upwardly to any desired position along the stringers, as illustrated in Fig. 1.

As best shown in Fig. 2, the pins 50 and 68 (to distinguish them the pin 50 has sometimes been called herein a stud) are of substantially the same length, and have their respective top and bottom ends in substantially coincident planes when both elements are disposed within the slider 20. This requires that the pin projection 82 be formed higher on the pin than the stop 64 is formed on its stud. The stud 50 and the pin 68 are of such lengths that when their projections 64 and 82, respectively, are in engagement substantial portions of the stud and pin extend above the slider. The stud is so dimensioned to help hold the slider 18 in position when inserting the pin, as shown in Fig. 3. By similarly dimensioning the length of the pin the tape ends are strengthened, the stringers 12 and 14 are both stiffened against undue flexibility between them, and undesired escape of the pin from the bottom stop assembly is prevented.

To further minimize undue flexibility between the stringers 12 and 14 and to prevent accidental opening of the fastener at the bottom, it is preferred to dispose the lowermost fastener element of the fastener chain on the pin side, that is, on stringer 14. The lowermost fastener element is designated 16' in Fig. 2. This results in the projection 82 and the lowermost fastener element 16' being confined between the stop 64 and the higher fastener element 16'', which is the lowermost fastener element on the stud side or stringer 12. The stud side or stringer 12 having the higher fastener element cannot be moved upwardly unduly because of the limiting action provided by the projection 82 upon the stop 64. The result is a more secure closure.

When the sliders 18 and 20 are adjacent each other, as shown in Fig. 3, the pin 68 must travel a curved path in the channels of the sliders when it is desired to disengage or initiate engagement of the stringers 12 and 14. So that the pin may be easily threaded into or out of the sliders, it is bent a suitable amount, as, for example, at the intermediate point 84. To facilitate bending of the metal the pin preferably is notched on both sides, as at 86, to thereby afford a smaller cross-section at the point of bending. Similarly, the stud 50 is bent at 88 and notched at 90 to permit the metal to be bent more easily at this point. The metal at the notches is used for improved securement of the stud and pin to their respective stringers. As shown in Fig. 4, for example, the metal at the notches may be bent over to form the tangs 92 and 94. These tangs are imbedded into the beaded edge of the tape and provide additional clamping strength. It shall be understood that both the stud and pin may be formed with additional notches throughout their lengths to provide added clamping power. The pins may be bent and notched before the clamping operation, or as they are being secured to their respective tape ends. Moreover, it is within the scope of the invention to form either pin or both to the desired configuration by die casting instead of from a metal strip. Also, either pin or both may be formed by molding them from a suitable plastic compound.

Figs. 8 to 11, inclusive, illustrate a modified form of the invention.

The most conspicuous change is the provision of a so-called "Q. D." (quick disassembly) or releasing end stop at the top of the stringers. This may be of the type disclosed in the pending application of Otto J. Moehler, Serial No. 29,837, filed May 28, 1948. In fact, other suitable quick exit means may be utilized at the top end of the fastener in combination with the novel separable bottom stop construction herein described, any other such construction being shown in U. S. patent to Mikulas 2,381,359, issued August 7, 1945.

Figure 8:
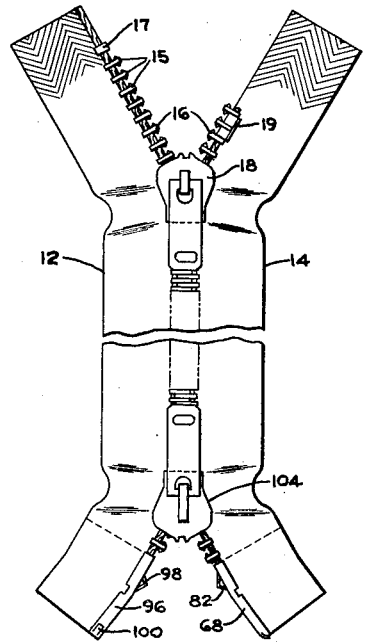
Fig. 8 is a view similar to Fig. 1 illustrating a modified form of the invention.

In Fig. 8 it will be observed that stringer 12 is longer than stringer 14 by the addition of fastener elements shown at 15. A permanent top stop 17 prevents escape of the sliders. Stringer 14 is provided with a so-called "slip stop" 19 which arrests upward movement of slider 18 when subjected to a normal or moderate force, but which permits the slider to move on further when subjected to a more forceful pull. In such case the slider 18 moves upwardly to the stop 17, and the stringer 14 is released from slider 18, permitting the stringers to be instantly pulled apart all the way down to the assembled separable bottom stop (it being assumed that the lower slider 104 is in its lowermost position shown in Fig. 9). The pin 68 readily pulls out of the bottom stop assembly as a part of the main separating movement. To reassemble the stringers it is necessary first to move the upper slider 18 down to the bottom stop assembly, but this is true of all "Q. D." fasteners.

Figure 10:
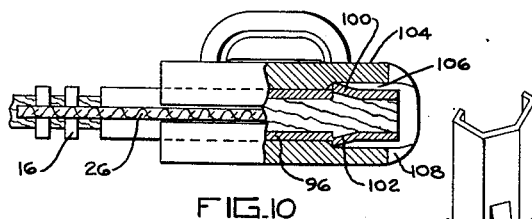
Fig. 10 is a view similar to Fig. 5 taken approximately in the plane of line 10—10 of Fig. 9.

The other elements of the slide fastener are the same as previously described with the exception of the stud 96, like numerals indicating similar elements. Like the stud 50, the stud 96 is formed with a stop 98 intermediate its ends in the plane of engagement of the fastener elements 16. However, instead of providing slider stops at the extreme lower end of the stud, one or more stops 100 and 102 are formed or struck up a short distance above the extreme lower end of the stud. In order that the slider stop or stops 100 and 102 will not be visible when the bottom slider, designated 104, is in its lowermost position, the slider 104 may be formed with a recess 105 adjacent the slider neck 108 on the stud side of the fastener. As best shown in Fig. 10, the slider stops 100 and 102 disappear within the slider 104 and provide a smooth, unobstructed lower end for the stringer 12. For the purpose of affording symmetry in slider manufacture, the pin side of the slider may be formed with a recess 110 on the other side of the neck 108. This construction also permits the stringers 12 and 14 to be made of the same length. The described modification operates and functions in the same manner as heretofore described with respect to the slide fastener shown in Figs. 1 through 7, except for the quick release feature previously described.

Figure 12:
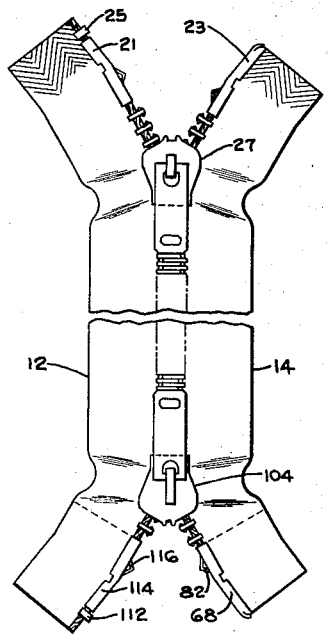
Fig. 12 is a view similar to Fig. 1 illustrating still another modification of the invention.
Figure 9:
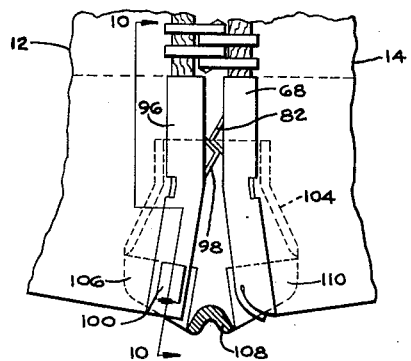
Fig. 9 is a view similar to Fig. 2 illustrating in detail the modified form of the invention.
Figure 13:
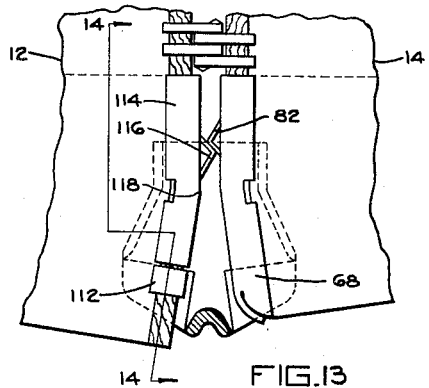
Fig. 13 is a view similar to Fig. 2 illustrating in detail this second modification of the invention.
Figure 14:
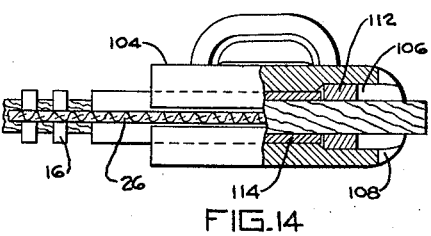
Fig. 14 is a view, partly in section, taken approximately in the plane of line 14—14 of Fig. 13.
Figure 11:
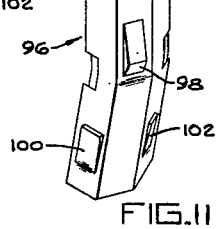
Fig. 11 is a view similar to Fig. 6 illustrating a modification of the stud-like element used in the modified form of the invention.

Figs. 12, 13 and 14 illustrate still another modification of the invention. The most conspicuous change is the provision of pins 21 and 23 at the top of the stringers in addition to the pins 114 and 68 at the bottom of the stringers. As heretofore described, the stringers may be fully separated and re-engaged at one end only of the fastener, but it is within the scope of the invention to provide a fastener wherein the stringers may be separated and re-engaged at either end of the fastener. For this purpose it is merely necessary to duplicate at the top of the fastener the pins previously described for the bottom. One of the pins, in this case the pin 21, may be considered to be the stud, and is provided with a suitable slider stop 25. It will be evident that by moving the sliders 27 and 104 to the upper end of the fastener the stringers may be separated and re-engaged at the upper end, and conversely, by moving both sliders to the lower end of the fastener the stringers may be separated or re-engaged at the lower end.

The other elements of the slide fastener are the same as the constructions previously described, with the exception of the stud, like numerals designating like elements. Whereas the slider stops previously shown are formed as an integral part of the stud, the slider stop on the slider retaining stringer 12 may be formed separately. The slider bottom stop, designated 112, is clamped onto the beaded edge 28 of the tape 26 immediately below the lower edge of the stud 114. The stud 114 is of shorter length than the studs 50 and 96 previously described. The combined length of the stud 114 and the stop 112 along the beaded edge of the tape, is approximately equal to the length of the pin 68 which is secured to the stringer 14. Like the previously described constructions, the stud 114 has a stop projection 116. The stop 116 limits the movement of the pin 68 and properly positions the stringer 14 when the projection 82 engages the stop 116. Also, the slider 104 is formed with a recess 106 adjacent the neck 108 so that the separately formed stop 112 will disappear within the slider when it is in its lowermost position as shown in Fig. 13. Preferably, the stud 114 is bent below the stop 116, as at 118, to permit the slider 104 to move freely over the stud.

The top stud 21 may be identical with the bottom stud 114 and provided with similar stops for the slider and for the pin, and similarly, the top pin 23 may be identical with the bottom pin 68. The slider 27 may, of course, be the same as the slider 104, thus making the entire construction symmetrical.

It will be understood that various modified features of the invention may be interchanged, and are not exclusive to the particular arrangements shown in the drawing. For example, the slider stops 60, 62 of Figs. 1 through 5 of the drawing may be employed with a fastener having a Q. D. top stop, as in Fig. 8, or a fastener having pins at both ends, as in Fig. 12. Similarly, the slider stops 100 shown in Figs. 8 through 11 may be employed with a fastener having permanent top stops, as in Fig. 1, or pins at both ends, as in Fig. 12. Likewise the separate slider stop 112 shown in Figs. 12 through 14 may be employed with a slider having permanent top stops, as in Fig. 1, or a Q. D. top stop, as in Fig. 8.

It was mentioned in connection with Fig. 1 that the slider 18 is preferably provided with an automatic lock and that the slider 20 is preferably provided with a wing lock. In Fig. 8 ordinary sliders are shown, but a similar combination of automatic lock at the top and wing lock at the bottom may be employed, if desired. In the arrangement of Fig. 12 the sliders 27 and 104 may be ordinary non-locking sliders, or they may both be wing lock sliders. The matter is not at all critical, but the slider used in cooperation with the pins, if made a wing lock slider, does not necessitate cutting a notch or recess in the pin, to mate with and receive a locking tooth such as is employed in a pin lock or automatic lock. However, a cam lock type of slider also may be employed without modification of the pins, and may accordingly be used in lieu of the wing lock sliders previously referred to. Of course, it is a comparatively simple thing to provide a notch or recess in the pin where needed, if, for some reason, it be preferred to employ either a pin lock or an automatic lock.

Some further description may be helpful in connection with the stop 64 and projection 82 shown in Fig. 1, and the corresponding stops 98 and 116 shown in Figs. 8 and 12. On the one hand these stops are sufficiently large in dimension to prevent the projection from being moved past the stop, but on the other hand are kept small enough in dimension not to prevent upward movement of the bottom slider. For the same reason the lower faces of both the stop 64 and the projection 82 are preferably inclined or sloped downwardly at so sharp an angle as to facilitate easy movement past the neck portion 38 of the slider. As shown in Figs. 2 and 3, the stop 64 and the projection 82 are located in the region of the narrow or stem ends of the sliders 18 and 20 when the sliders are adjacent each other with the pins 50 and 68 received therein. The stop and projection are shaped to permit free lateral separation of the pins 50 and 68 when both of the sliders have been moved away from the region of the pins, as shown in Fig. 1.

It is believed that the construction and operation of my improved separable slide fastener, as well as the advantages thereof, will be apparent from the foregoing detailed description. By means of my novel slide fastener one is enabled to eliminate the usual clip or socket, the numerous operations required for its manufacture and the attaching operation which has been necessary for its incorporation into the fastener. The ordinary slider serves its usual function of opening and closing a fastener but, in addition, provides a socket which enables the stringers to be separably coupled. My invention also permits its use in a garment or other article to connect the edges thereof for any desired segment along the opening, from either or both ends thereof, and still permits complete separation of the parts to which the stringers are attached. Furthermore, with these attendant improvements and new functions, the manipulative operation of my novel slide fastener is so similar to the existing commercial types that the ultimate user thereof in an article or garment requires little or no education to attain the benefits thereof.

It will be apparent that while I have shown and described my invention in several preferred forms, changes may be made in the structure shown without departing from the spirit of the invention, as sought to be defined in the following claims.

In the claims the reference to "double-acting elements" is not intended to be limited to symmetrical elements, and instead is intended to apply to elements which may be engaged or disengaged (meshed or unmeshed) in either direction, that is, by means of either of the two sliders. In the claims the reference to "conventional" sliders is intended to include sliders having a convergent or Y-shaped passage, with a neck or post between the arms of the Y, and thereby adapted to mesh or unmesh fastener elements.

I claim:

1. A fully separable slide fastener comprising a pair of stringers, each stringer being provided with spaced interlockable fastener elements of the type permitting engagement or disengagement in either direction, a pair of sliders mounted on said stringers with their narrow ends toward each other so that movement of one slider toward the other disengages the fastener elements and movement in the other direction engages the fastener elements, either of said sliders providing a socket for separably coupling the stringers, a pin provided at each end of one stringer and having a projection thereon in the plane of interlocking engagement of the fastener elements, and a stud provided at each end of the second stringer and having a projection in the plane of interlocking engagement of the fastener elements, and a slider stop at each end of the second stringer, said pins being bent to facilitate threading into or out of the sliders when the sliders are adjacent each other at one end or the other of the fastener, said studs being bent to facilitate movement of the sliders thereover, the pin projection engaging the stud projection to limit the threading movement of the pin, and the sliders being retained on the second stringers when the stringers are fully separated.

2. A fully separable slide fastener comprising a pair of stringers, each stringer being provided with spaced interlockable fastener elements of the type permitting engagement or disengagement in either direction, a pair of sliders mounted on said stringers with their stem ends toward each other so that movement of one slider toward the other disengages the fastener elements and movement in the opposite direction engages the fastener elements, and separable end stop means permitting one stringer to be fully separated from or assembled with the other stringer, said means including one of said sliders acting also as a socket at the end of one of the stringers for receiving the end of the second stringer for separably coupling the stringers when the sliders are adjacent each other at said end of the first stringer, a slider stop means on said first stringer at said end of the fastener, a slider-aligning stud on said first stringer, said stud having a length such that it is received within both sliders when the sliders are adjacent each other at the stop, and pin means on the second stringer at said end of the fastener to facilitate threading the same into or out of the two sliders when they are adjacent each other at the stop, said stud and said pin means having cooperating means to limit the insertion of the pin means through the sliders, the elements being unmeshed when the pin means is received within the adjacent sliders at said slider stop, said pin means having an overall length such as to substantially reach the lowermost element.

3. A fully separable slide fastener comprising a pair of stringers having double-acting elements, a slider, and a fully separable bottom stop, said bottom stop comprising a first pin on one stringer, a second pin on the other stringer, and a second slider acting as a socket to receive said pins, one of said pins having a first stop means for the sliders and having a second stop means for limiting the insertion of the other pin into said sliders when the sliders are adjacent one another at the first stop means, said other pin itself having a third stop means cooperating with the said second stop means for limiting the pin insertion as aforesaid, said sliders being disposed with their narrow or stem ends toward one another and their wide or neck ends remote from one another.

4. A fully separable slide fastener comprising a pair of stringers having double-acting elements, a slider, and a fully separable bottom stop, said bottom stop comprising a first pin on one stringer, a second pin on the other stringer, and a second slider acting as a socket to receive said pins, one of said pins having a first stop means for the sliders and having a second stop means for limiting the motion of the other pin into said sliders when the sliders are adjacent one another at the first stop means, said other pin itself having a third stop means cooperating with the said second stop means for limiting the pin insertion as aforesaid, said sliders being disposed with their narrow or stem ends toward one another and their wide or neck ends remote from one another, the elements on at least one of said stringers terminating at such a distance from the first stop means as to be located above the stem portion of the first slider when the sliders are adjacent one another at the first stop means, whereby the fastener elements are then unmeshed.

5. A fully separable slide fastener comprising first and second stringers having double-acting elements, a slider for opening said stringers from the top toward the bottom as far as desired, a second slider for opening said stringers from the bottom toward the top as far as desired, said first and second sliders being arranged with their narrow or stem ends toward one another, and their wide or neck ends remote from one another, a pin at the bottom end of said first stringer, said pin being long enough to hold said sliders in superposed registration when moved all the way to the bottom of said stringer, and a pin on the second stringer to facilitate threading the end of said stringer through the superposed sliders when re-assembling the stringers after full separation, said second pin having a length substantially as great as that of the first pin, said first and second pins each having a cooperating insertion-limit stop projection to limit the threading movement of the second pin when re-assembling the fastener, said insertion-limit stop projections being individually small enough to permit the pin with its stop projection to pass freely through the slider and being located in the region of the stem ends of the adjacent sliders where the first and second pins are close together, and being so shaped as to permit free lateral separation of the pins when both of the sliders have been moved away from said pins.

6. A fully separable slide fastener comprising first and second stringers having double-acting elements, a slider for opening said stringers from the top toward the bottom as far as desired, a second slider for opening said stringers from the bottom toward the top as far as desired, said first and second sliders being arranged with their narrow or stem ends toward one another, and their wide or neck ends remote from one another, a pin at the bottom end of said first stringer, said pin being long enough to hold said sliders in superposed registration when moved all the way to the bottom of said stringer, and a pin on the second stringer to facilitate threading the end of said stringer through the superposed sliders when re-assembling the stringers after full separation, said second pin having a length substantially as great as that of the first pin, said first pin having slider stop means at its outer end, said first and second pins each having a cooperating pin stop projection to limit the threading movement of the second pin when re-assembling the fastener, said pin stop projection being small enough to permit the pins with said projections to pass freely through the slider and being located at a point in the region of the narrow or stem ends of the sliders when the sliders are adjacent each other at the slider stop means, and being so shaped as to permit free lateral separation of the pins when both of the sliders have been moved away from said pins.

7. A fully separable slide fastener comprising a pair of stringers, each stringer being provided with spaced interlockable fastener elements of the type permitting engagement or disengagement in either direction, a pair of sliders mounted on said stringers with their stem ends toward each other so that movement of one slider toward the other disengages the fastener elements and movement in the opposite direction engages the fastener elements, and separable end stop means permitting one stringer to be fully separated from or assembled with the other stringer, said means including one of said sliders acting also as a socket at the end of one of the stringers for receiving the end of the second stringer for separably coupling the stringers when the sliders are adjacent each other at said end of the first stringer, a slider stop means on said first stringer at said end of the fastener, a slider-aligning stud on said first stringer, said stud having a length such that it is received within both sliders when the sliders are adjacent each other at the stop, a pin on the second stringer at said end of the fastener to facilitate threading the same into or out of the two sliders when they are adjacent each other at the stop, said stud and said pin having approximately the same length and each having a cooperating projection to limit the insertion of the pin through the sliders, the elements being unmeshed when the pin is received within the adjacent sliders at the stop, and said pin and stud being bent to facilitate the movement of the sliders thereover, said cooperating insertion-limit projections being individually small enough to permit the stud or pin with its stop projection to pass freely through the slider and being located at a point in the region of the stem ends of the sliders when the sliders are adjacent each other at the slider stop, and being so shaped as to permit free lateral separation of the stud and pin when both of the sliders have been moved away from the same.

8. A fully separable slide fastener comprising a pair of stringers, each stringer being provided with spaced interlockable fastener elements of the type permitting engagement or disengagement in either direction, a pair of sliders mounted on said stringers with their stem ends toward each other so that movement of one slider toward the other disengages the fastener elements and movement in the opposite direction engages the fastener elements, one of said sliders acting also as a socket for receiving and separably coupling the stringers when the sliders are adjacent each other at one end of the fastener, a pin provided at the end of one stringer having a projection thereon in the plane of interlocking engagement of the fastener elements, and a stud provided at the corresponding end of the second stringer, said stud being provided with a projection in the plane of interlocking engagement of the fastener elements and also being provided with a slider stop, said pin being bent to facilitate threading into or out of the two sliders when the sliders are adjacent each other at one end of the fastener, said stud being bent to facilitate movement of a slider thereover, the pin projection engaging the stud projection to limit the threading movement of the pin, the sliders being retained by the aforesaid slider stop on the second stringer when the stringers are fully separated, the stud having a length such that it is received within both sliders when the sliders are adjacent each other at the stop, the elements being unmeshed when the sliders are adjacent each other at the stop, said pin and stud projections being individually small enough to permit the stud or pin with its stop projections to pass freely through the slider and being located at a point in the region of the stem ends of the sliders when the sliders are adjacent each other at the slider stop, and being so shaped as to permit free lateral separation of the pin and stud when both of the sliders have been moved away from the same.

9. A fully separable slide fastener comprising a pair of stringers, each stringer being provided with spaced interlockable fastener elements of the type permitting engagement or disengagement in either direction, a pair of sliders mounted on said stringers with their stem ends toward each other so that movement of one slider toward the other disengages the fastener elements and movement in the opposite direction engages the fastener elements, one of said sliders acting also as a socket for receiving and separably coupling the stringers when the sliders are adjacent each other at one end of the fastener, a pin provided at the end of one stringer having an integrally formed projection thereon in the plane of interlocking engagement of the fastener elements, and a stud provided at the corresponding end of the second stringer, said stud being provided with an integrally formed projection in the plane of interlocking engagement of the fastener elements and also being provided with an integrally formed slider stop, said pin being bent to facilitate threading into or out of the two sliders when the sliders are adjacent each other at one end of the fastener, said stud being bent to facilitate movement of a slider thereover, the pin projection engaging the stud projection to limit the threading movement of the pin, the sliders being retained by the aforesaid slider stop on the second stringer when the stringers are fully separated, the stud having a length such that it is received within the stem portion of the upper slider when the sliders are adjacent each other at the stop, and said pin having approximately the same length as the stud, whereby the elements terminate above the stem portion of the upper slider and are therefore unmeshed, the lowermost fastener element being on the pin side of the fastener and being located immediately adjacent the upper end of the pin, said pin and stud projections being individually small enough to permit the stud or pin with its stop projection to pass freely through the slider and being located at a point in the region of the stem ends of the sliders when the sliders are adjacent each other at the slider stop, and being so shaped as to permit free lateral separation of the pin and stud when both of the sliders have been moved away from the same.

10. A fully separable slide fastener comprising a pair of stringers, each stringer being provided with spaced interlockable fastener elements of the type permitting engagement or disengagement in either direction, a pair of sliders mounted on said stringers with their stem ends toward each other so that movement of one slider toward the other disengages the fastener elements and movement in the opposite direction engages the fastener elements, and separable end stop means permitting one stringer to be fully separated from or assembled with the other stringer, said means including one of said sliders acting also as a socket at the end of one of the stringers for receiving the end of the second stringer for separably coupling the stringers when the sliders are adjacent each other at one end of the fastener, a slider stop means on the first stringer at said end of the fastener, the elements on at least one of said stringers terminating at such distance from the slider stop means that the fastener elements are unmeshed when said sliders are adjacent each other at said slider stop means, and additional means for limiting the insertion of the second stringer through the adjacent sliders when assembling the stringers, said additional insertion limit means comprising a projection on each of said stringers, said projections each being located beyond its endmost fastener element, the projection on said second stringer engaging the projection on said first stringer to limit the insertion movement of said second stringer.

11. A fully separable slide fastener comprising a pair of stringers, each stringer being provided with spaced interlockable fastener elements of the type permitting engagement or disengagement in either direction, a pair of sliders mounted on said stringers with their stem ends toward each other so that movement of one slider toward the other disengages the fastener elements and movement in the opposite direction engages the fastener elements, and separable end stop means permitting one stringer to be fully separated from or assembled with the other stringer, said means including a slider stop on one stringer and further including one of said sliders acting also as a socket for receiving the end of the second stringer for separably coupling the stringers when the sliders are adjacent each other at the stop, said end of the second stringer being provided with an elongated pin to facilitate threading the same into or out of the two sliders when the sliders are adjacent each other at the stop, and additional means for limiting the insertion of the pin through the adjacent sliders when assembling the stringers, said additional insertion limit means comprising a projection on said first stringer located beyond its endmost fastener element and a projection on said pin for engagement with said first projection, said pin being of such length that the elements are unmeshed when the sliders are adjacent each other at said stop with said pin received within said sliders.

ALBERT BASHOVER.

REFERENCES CITED

The following references are of record in the file of this patent:

UNITED STATES PATENTS

| Number | Name | Date |
|---|---|---|
| 1,817,838 | Poux | Aug. 4, 1931 |
| 1,934,084 | Murphy | Nov. 7, 1938 |
| 2,114,747 | Murphy | Apr. 19, 1938 |
| 2,180,928 | Kohler | Nov. 21, 1939 |
| 2,463,937 | Austin | Mar. 8, 1949 |
| 2,519,012 | Babcock | Aug. 15, 1950 |